(12) United States Patent
Ebert et al.

(10) Patent No.: US 8,696,472 B2
(45) Date of Patent: Apr. 15, 2014

(54) ARRANGEMENT WITH JOINT AND GEARWHEEL BODY

(71) Applicant: Neumayer Tekfor Holding GmbH, Hausach (DE)

(72) Inventors: Alexander Ebert, Oberkirch (DE); Martin Lehmann, Hornberg (DE); Tobias Roser, Friesenheim (DE); Thomas Etzold, Offenburg (DE); Tim Benz, Hausach (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 0 days.

(21) Appl. No.: 13/869,504

(22) Filed: Apr. 24, 2013

(65) Prior Publication Data
US 2013/0237331 A1 Sep. 12, 2013

Related U.S. Application Data

(63) Continuation of application No. PCT/DE2011/002071, filed on Dec. 1, 2011.

(30) Foreign Application Priority Data

Dec. 23, 2010 (DE) .......................... 10 2010 056 112

(51) Int. Cl.
*F16D 3/223* (2011.01)
(52) U.S. Cl.
USPC ............................................ 464/15; 464/906
(58) Field of Classification Search
USPC .............................. 464/15, 145, 173, 178, 906
See application file for complete search history.

(56) References Cited

U.S. PATENT DOCUMENTS

| 3,176,477 | A | 4/1965 | Mazziotti |
| 4,417,643 | A | 11/1983 | Guimbretierè |
| 4,457,395 | A | 7/1984 | Ernst et al. |
| 4,668,111 | A | 5/1987 | Kapaan |
| 4,986,607 | A | 1/1991 | Hofmann et al. |
| 5,116,293 | A * | 5/1992 | Reuter ................. 464/15 X |
| 6,290,605 | B1 | 9/2001 | Coenen et al. |
| 6,551,190 | B2 | 4/2003 | Hofmann et al. |
| 6,692,157 | B2 | 2/2004 | Sahashi et al. |

(Continued)

FOREIGN PATENT DOCUMENTS

| DE | 31 26 192 A1 | 1/1983 |
| DE | 37 00 868 C1 | 7/1988 |

(Continued)

OTHER PUBLICATIONS

German Search Report dated Nov. 14, 2011 including English-language translation (Ten (10) pages).

(Continued)

*Primary Examiner* — Gregory Binda
(74) *Attorney, Agent, or Firm* — Crowell & Moring LLP

(57) ABSTRACT

An arrangement with a joint and a gearwheel body for a transmission is provided in which the joint is a constant velocity joint arranged at least partially in an interior space enclosed by the gearwheel body. The constant velocity joint has inner and outer hub tracks and a bearing cage arranged to maintain an essentially constant control angle between tangential ball contact points with the inner and outer tracks while the bearing cage holds the balls in a plane.

7 Claims, 5 Drawing Sheets

(56) References Cited

U.S. PATENT DOCUMENTS

| | | | |
|---|---|---|---|
| 6,881,107 B2 | 4/2005 | Roycroft | |
| 7,040,992 B2 | 5/2006 | Dine et al. | |
| 7,419,434 B2 * | 9/2008 | Wormsbaecher | 464/178 |
| 7,736,239 B2 * | 6/2010 | Niederhufner et al. | 464/906 |
| 8,523,687 B2 * | 9/2013 | Lutz et al. | 464/145 |
| 2010/0099503 A1 * | 4/2010 | Kohara | 464/15 |

FOREIGN PATENT DOCUMENTS

| | | |
|---|---|---|
| DE | 38 20 449 A1 | 12/1989 |
| DE | 39 07 105 A1 | 9/1990 |
| DE | 199 04 960 C1 | 11/2000 |
| DE | 100 54 421 A1 | 5/2002 |
| DE | 10 2005 003 388 A1 | 8/2005 |
| DE | 10 2007 016 414 A1 | 10/2008 |
| DE | 10 2010 027 059 A1 | 1/2012 |
| EP | 1 126 188 A1 | 8/2001 |
| GB | 1 213 931 | 11/1970 |
| WO | WO 02/14092 A1 | 2/2002 |
| WO | WO 2006/074678 A1 | 7/2006 |

OTHER PUBLICATIONS

International Search Report dated Mar. 8, 2012 including English-language translation (Six (6) pages).

* cited by examiner

PRIOR ART

ARRANGEMENT WITH JOINT AND GEARWHEEL BODY

CROSS REFERENCE TO RELATED APPLICATIONS

This application is a continuation of PCT International Application No. PCT/DE2011/002071, filed Dec. 1, 2011, which claims priority under 35 U.S.C. §119 from German Patent Application No. 10 2010 056 112.6, filed Dec. 23, 2010, the entire disclosures of which are herein expressly incorporated by reference.

BACKGROUND AND SUMMARY OF THE INVENTION

The invention relates to an arrangement with a joint and a gearwheel body for a transmission, wherein the joint is arranged at least partially in an interior space enclosed by the gearwheel body.

An arrangement conforming to its genre is described, for example, in German patent specification DE 199 04 960 C1. The joint that is disclosed in said patent involves, in particular, a universal joint. Such universal joints are inserted, for example, in skew bevel gears of transfer cases and welded thereto. In addition to the asynchronism, there is the drawback that such universal joints cannot withstand the torque loads to be expected in future engines of motor vehicles.

The object of the present invention is to propose an arrangement of gearwheel bodies and joints that also allows the transmission of higher torques.

This engineering object is achieved, according to the invention, by the fact that the joint is a constant velocity joint. In this case the gearwheel body is, in particular, a part of the transmission.

One embodiment comprises that the joint (i.e. the constant velocity joint) has an inner hub with a longitudinal axis and inner ball tracks; that the joint has an outer hub with a longitudinal axis and outer ball tracks, wherein the inner ball tracks and the outer ball tracks are arranged in pairs in relation to each other; that the joint has a cage with windows that are distributed over the periphery; that the cage is arranged between the inner hub and the outer hub; that the joint has balls, which are arranged in the windows of the cage and in the pairs of the inner ball tracks and the outer ball tracks and which are held in a plane by the cage, wherein the tangential planes at the points of contact of the balls with the inner ball tracks and the outer ball tracks form a control angle, wherein the inner ball tracks have in each case an active section, in which the balls move, and wherein the outer ball tracks have in each case an active section, in which the balls move.

One embodiment provides that at least the active sections of the inner ball tracks have in each case a curvature that in essence changes continuously along the associated longitudinal axis, that at least the active sections of the outer ball tracks have in each case a curvature that in essence changes continuously along the associated longitudinal axis, and that the curvature of the active sections of the inner ball tracks and the curvature of the active sections of the outer ball tracks are designed and adapted to each other in such a way that the control angle is essentially constant at least between the states of the totally extended joint and the maximally deflected joint. As a result, the curvature of the tracks changes along the longitudinal axis of the respective hub. See in this respect U.S. Pat. No. 8,523,687, corresponding to German patent application DE 10 2010 027 059.8, which was filed by the applicant and is not a prior publication. The track curvatures of this special joint are designed in such a way that when the joint bends, the control angle remains constant as compared to the prior art.

The following embodiments relate, in particular, to the aforementioned special constant velocity joint. One embodiment provides that the inner ball tracks have in essence completely a curvature that in essence changes continuously along the associated longitudinal axis. Thus, the continuous curvature also relates, for example, to regions, in which the balls may be located only during the assembly of the joint. One embodiment comprises that the outer ball tracks have in essence completely a curvature that in essence changes continuously along the associated longitudinal axis. In this embodiment the same also applies to the outer ball tracks having a curvature that changes continuously over its entire course. One embodiment provides that at least the active sections of the inner ball tracks extend in a plane with the associated longitudinal axis. As a result, the active ball tracks have no lateral offset over their entire course. One embodiment comprises that the inner ball tracks extend in essence completely in a plane with the associated longitudinal axis. One embodiment provides that at least the active sections of the outer ball tracks extend in a plane with the associated longitudinal axis. In this embodiment the outer ball tracks are in alignment with the longitudinal axis of the outer hub. One embodiment comprises that the outer ball tracks extend in essence completely in a plane with the associated longitudinal axis. One embodiment provides that the curvature of the active sections of the inner ball tracks and the curvature of the active sections of the outer ball tracks follow the same mathematical function. In this embodiment the ball tracks that are assigned to each other in pairs are uniform. One embodiment comprises that the curvature of at least the active sections of the inner ball tracks and/or the curvature of at least the active sections of the outer ball tracks can be described at least approximately by a mathematical function that is linear at least in sections. One embodiment provides that the curvature of at least the active sections of the inner ball tracks and/or the curvature of at least the active sections of the outer ball tracks can be described at least approximately by a mathematical function that is elliptical at least in sections.

One embodiment comprises that an outer side of the outer hub is in contact with an inner side of the gearwheel body at least by means of a press fit and/or form fit.

One embodiment provides that the outer hub is arranged, in particular, is fixed, between a shoulder of the gearwheel body and a bearing cover. In this embodiment the inner side of the gearwheel body has a shoulder, against which the outer hub of the joint rests with one side. On the other side of the outer hub there is a bearing cover, which in this embodiment also closes off one side of the arrangement or specifically the gearwheel body. At the same time, for example, the inner hub or a shaft, which is connected to the inner hub, projects from the bearing cover.

One embodiment comprises that the bearing cover has a nose, which faces the outer hub and which is, in particular, elastically deformable or plastically deformable or resilient. In this embodiment the bearing cover has an extension, which acts preferably as a stop for the outer hub. In this case the nose can be deformed or reformed in an elastic or plastic manner, for example, during the assembly. Preferably the nose is deformed outwards, i.e. in the direction of the gearwheel body. In an additional embodiment the nose is designed in such a way that it is resilient. With this nose it is possible, for example, to compensate for the tolerances of the components.

One embodiment consists of the fact that the gearwheel body and the bearing cover are connected to one another, in particular, are welded to one another. One design variant provides, in particular, that the welding of the gearwheel body with the bearing cover entails a pressing of the gearwheel body and the bearing cover against each other with a concurrent welding. In this embodiment the gearwheel body and the bearing cover are welded to one another, whereby in one embodiment an axial pressure is exerted during the welding so that the gearwheel body and the bearing cover are pressed against each other.

One embodiment provides that the outer hub is arranged, in particular, is fixed, between a shoulder of the gearwheel body and a bead of the gearwheel body. One design variant provides, in particular, that the bead of the gearwheel body is produced after the outer hub is inserted into the interior space of the gearwheel body. In this embodiment the outer hub is clamped between the stop of the gearwheel body and a bead of the gearwheel body, wherein the bead is produced preferably after the outer hub is inserted into the interior space of the gearwheel body. That is, on the side of the bead the material of the gearwheel body is plastically defined and is deformed, in particular, in the direction of the interior space. For this purpose it is provided, for example, that the gearwheel body is not yet hardened following the insertion of the outer hub and prior to the production of the bead. In this design variant, for example, at least the outer hub and the gearwheel body are hardened first in the assembled state. In one design variant at least one component, for example, the outer hub, is already partially pre-hardened.

One embodiment comprises that at least one sealing element is provided. This sealing element is arranged between the outer hub and the bearing cover and opens out on the inner hub and/or an extension of the inner hub. One embodiment provides that the sealing element, for example, a bellows, is pressed between the outer hub and the bearing cover and has elastic properties, i.e. can be mechanically loaded.

One embodiment provides that a closing element, in particular a sheet metal hat, is provided on a side of the joint that faces away from the bearing cover. In this embodiment the side of the inventive arrangement that faces away from the bearing cover or more specifically the side of the gearwheel body that faces away from the bearing cover is at least partially closed by a closing element. In this case, it involves, for example, a type of sheet metal hat having a cylindrical construction that is inserted into a recess of the gearwheel body.

One embodiment comprises that a fill element, in particular a closed cell fill element, is arranged in at least one cavity of the arrangement. In this case one design variant provides that the fill element, for example, a foam element, is arranged on the side of the outer hub that faces the sheet metal hat. In this embodiment an interior space of the arrangement is populated with a fill element, for example, an element made of foam. Preferably the material that is used is stable with respect to lubricants and with respect to temperature. The fill element reduces the space which exists around the joint and which is filled, for example, with lubricating grease so that the joint will function reliably. A cavity can be produced, for example, by a light-weight construction of the arrangement and, in particular, if the outer dimensions of the arrangement or more specifically the components of the arrangement are maintained.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
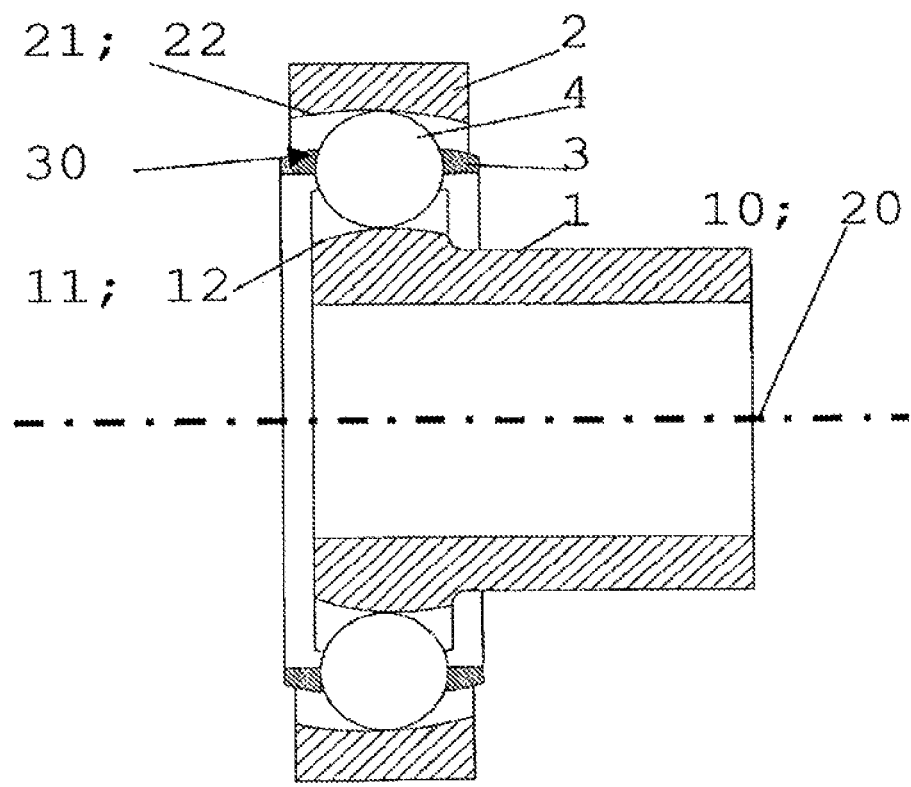
FIG. 1 is a sectional view of a schematic joint in the non-deflected state.

FIG. 1 is a sectional view through a joint (cf. the aforementioned application bearing the German patent application number DE 10 2010 027 059.8), which in one embodiment is a part of the arrangement according to the invention. Between the inner hub 1 and the outer hub 2 there are balls 4 for the purpose of transmitting the torque between the two hubs 1, 2. The balls 4 have inner ball tracks 11 in the inner hub 1 and outer ball tracks 21 in the outer hub 2. These inner ball tracks and outer ball tracks accommodate in pairs a ball 4. The balls 4 are arranged in a window 30 of the cage 3, which may be found between the inner hub 1 and the outer hub 2 and which holds the balls 4 in a plane. In the design variant that is shown in this embodiment the active sections 22 of the outer ball tracks 21 coincide with the outer ball tracks 21, or the active sections 12 of the inner ball tracks 11 coincide with the inner ball tracks 11. The joint is depicted in the totally extended, i.e. non-deflected state, in which the longitudinal axis of the outer hub 20 and the inner hub 10 coincide. Thus, it is also the longitudinal axis of the joint.

Figure 2:
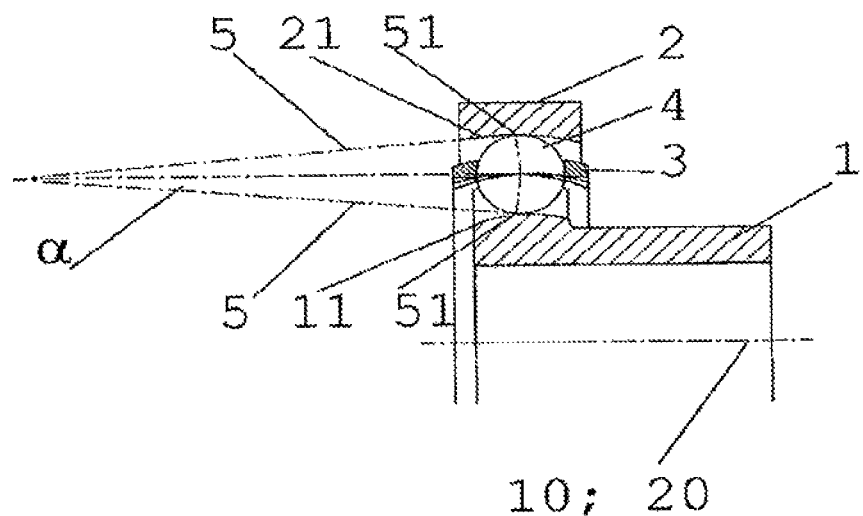
FIG. 2 shows a detail of the joint from FIG. 1.

The detail in FIG. 2 shows the tangential planes 5 at the points of contact 51 of the balls 4 with the inner 11 and the outer ball tracks 21. They form the control angle α. The control angle α changes in the case of the joints known from the prior art as a function of the deflection angle of the joint. In case of the joint that is shown in this embodiment and is used advantageously in the arrangement according to the invention, the control angle α is the same at each deflection. This feature can be achieved, for example, if the ball tracks conform to an elliptical function.

Figure 3:
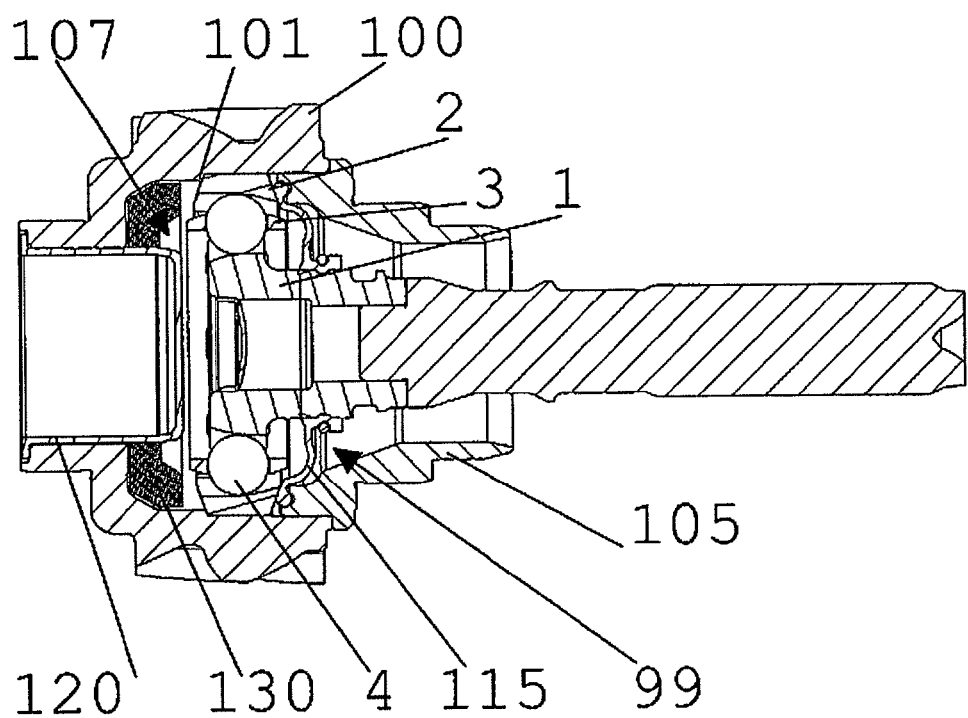
FIG. 3 shows an embodiment according to the invention.

FIG. 3 shows an inventive arrangement with a joint 99 (in this case it involves, for example, a joint from FIGS. 1 and 2) and a gearwheel body 100 (in this case it involves, for example, an output gearwheel of a transmission). In this embodiment the gearwheel body 100 of the transmission, which is otherwise not illustrated, has a cylindrical extension on a side, which may be found on the left hand side of the drawing in this embodiment. The constant velocity joint 99 is disposed in the interior space enclosed by the gearwheel body 100. At the same time the outer hub 2 is connected preferably in a positive locking and friction locking manner to the inner side of the gearwheel body 100 and rests with one side against a stop 101 of the gearwheel body 100. One side of the interior space around the joint 99 or rather enclosed by the gearwheel body 100 is closed by a closing element 120. In this embodiment the closing element 120 is designed as a sheet metal hat, which is pressed into the cylindrically extending connecting section of the gearwheel body 100 and is, in addition, connected, for example, by adhesively cementing to said connecting section. In an additional design variant, which is not illustrated in this example, a damping element is provided between the outer hub 2 and the gearwheel body 100. Between the joint 99 and the inner wall of the gearwheel body 100 or rather the closing element 120 there is a cavity 107, which is partially filled with a fill element 130. The fill element 130 consists, for example, at least partially of a preferably closed cell foam, which is, in addition, preferably stable to grease and temperature. Since the joint 99 is enveloped with grease, the fill element 130 reduces the amount of grease required. In the illustrated embodiment the closing element 120 projects in the shape of a cylinder into the cavity 107; and the fill element 130 surrounds the closing element 120 in the shape of a ring, so that the outer contour of the fill element 130 is adapted to the inner contour of the gearwheel body 100. A bearing cover 105 is provided on the side of the joint 99, to which a wave-like section is connected. Between the bearing cover 105 and the inner hub 1 the interior space of the gearwheel body 100 around the joint 99 is closed by a sealing element 115. The sealing element 115, which is, for example, an elastic sealing bellows, is clamped between the bearing cover 105 and the outer hub 2 and is connected to the inner hub 1. The bearing cover 105 and the gearwheel body 100 are welded together, for example, in such a way that during the welding process an axial pressure is applied between the bearing cover 105 and the gearwheel body 100. Prior to the insertion of the pins of the gear shaft, the joint 99 per se is already closed off so that, in particular said joint is grease resistant.

Figure 4:
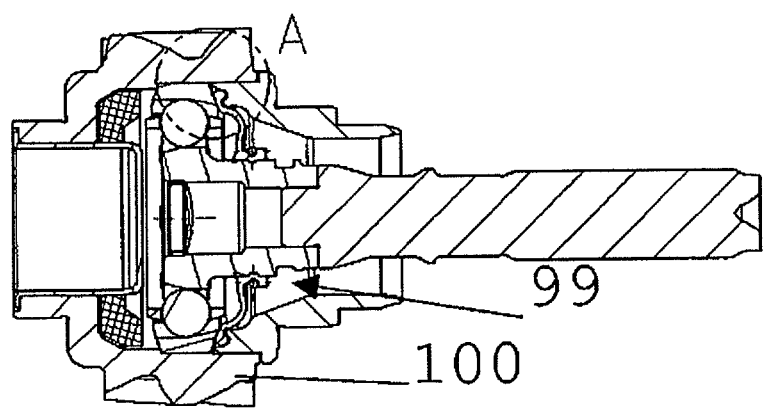
FIGS. 4 a) and b) show the embodiment from FIG. 3 and an enlarged detail.
Figure 4:
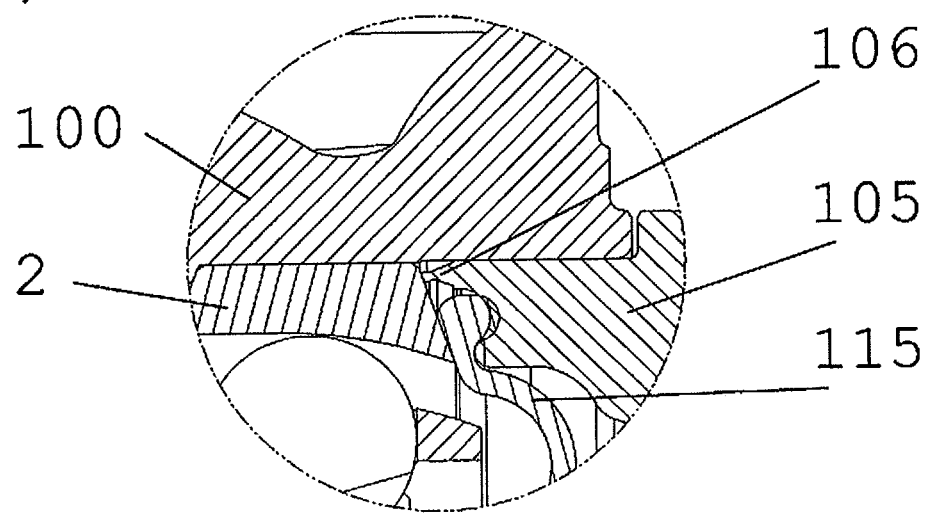

FIG. 4 a) shows the position of the enlarged detail from FIG. 4 b) in the arrangement from FIG. 3. The detail in FIG. 4 b) shows the region, in which the bearing cover 105 impinges on the outer hub 2. This occurs here via a nose 106 of the bearing cover 105. As a result, the nose rests on the outer hub 2 and thus, forms the counter element to the stop of the gearwheel body 100 for the axial fixation of the joint 99. In an alternative embodiment the nose 106 or rather the bearing cover 105 is inserted until the result is a plastic deformation of the nose 106. In an additional embodiment the nose 106 has resilient properties so that even changes resulting from tension between the gearwheel body 100 and the joint 99, can be compensated for. In this illustrated embodiment the gap that is shown here between the bearing cover 105 and the gearwheel body 100 is closed due to the welding.

Figure 5:
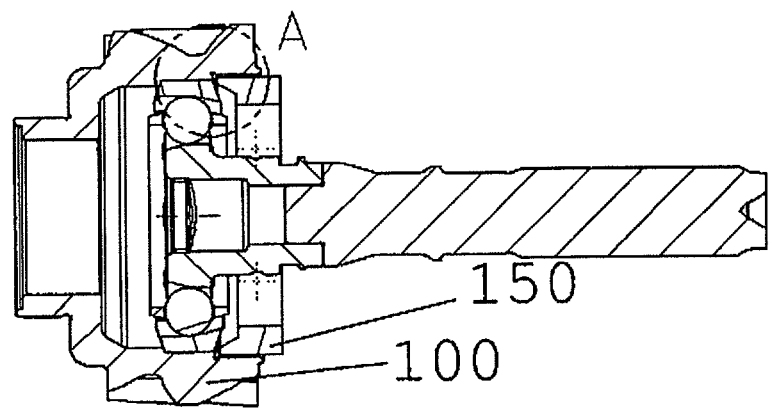
FIGS. 5 a) and b) show an additional design variant of an embodiment according to the invention during the assembly and an enlarged detail thereof.
Figure 5:
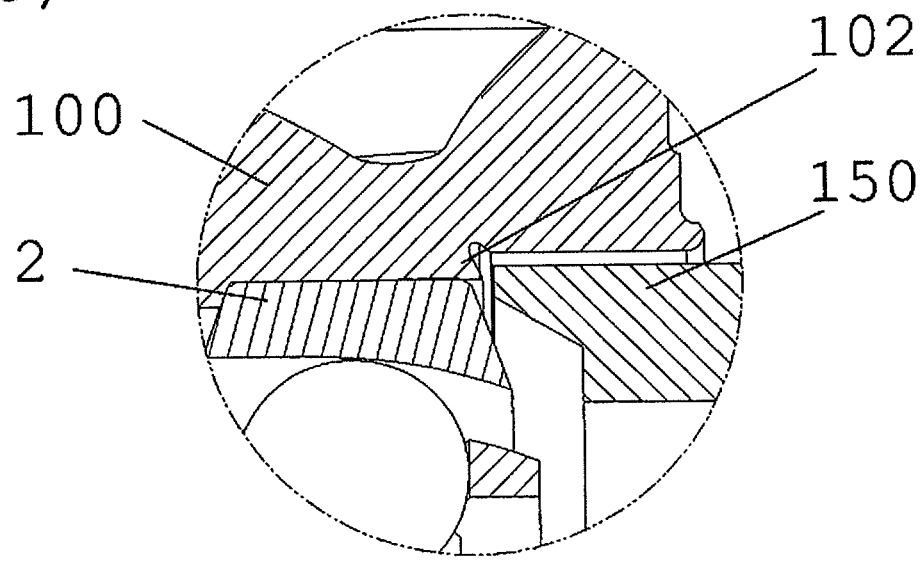

FIG. 5 a) and the enlargement of FIG. 5 b) show an alternative design variant in order to fix the outer hub 2 axially on the inner side of the gearwheel body 100. In this case the inner side of the gearwheel body 100 is reformed with a tool 150 after the joint 99 has been inserted into the interior space of the gearwheel body 100, so that a bead is produced in this region 102 of the gearwheel body 100. Due to this bead 102 the outer hub 2 is totally enveloped by the inner surface of the gearwheel body 100 and is held axially on said inner surface of the gearwheel body.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement with as joint and a gearwheel for a transmission, comprising:
    a constant velocity joint; and
    a gearwheel body,
    wherein the joint is arranged at least partially in an interior space enclosed by the gearwheel body,
    wherein the constant velocity joint includes
        an inner hub with inner ball tracks,
        an outer hub with outer ball tracks,
        the inner ball tracks and the outer ball tracks are arranged in pairs in relation to each other,
        a cage with windows that are distributed over the periphery arranged between the inner hub and the outer hub,
        balls arranged in the windows of the cage and in the pairs of inner ball tracks and outer ball tracks,
    wherein the balls are held in a plane by the cage,
    wherein said outer hub is fixed between a stop of said gearwheel body and a nose of a bearing cover, and
    wherein said nose impinges on said outer hub.

2. The arrangement as claimed in claim 1, wherein said nose is elastically deformable or plastically deformable or resilient.

3. The arrangement as claimed in claim 1, wherein
    a sealing element is clamped between said outer hub and said bearing cover and is connected to said inner hub.

4. The arrangement as claimed in claim 1, wherein
    a closing element is provided being at least partially located within said gearwheel body on a side of said constant velocity joint facing away from said bearing cover.

5. The arrangement as claimed in claim 4, wherein
    the closing element is a sheet metal hat.

6. The arrangement as claimed in claim 1, wherein
    a fill element is arranged in said interior space enclosed by said gearwheel body, wherein said fill element comprising at least partially a foam.

7. The arrangement as claimed in claim 6, wherein
    the fill element is a closed cell foam.

* * * * *